United States Patent [19]

Bochmann

[11] Patent Number: 4,743,894

[45] Date of Patent: May 10, 1988

[54] OWNER IDENTIFICATION SYSTEM FOR ELECTRONIC EQUIPMENT, PARTICULARLY AUTOMOTIVE AUDIO EQUIPMENT

[75] Inventor: Harald Bochmann, Hanover, Fed. Rep. of Germany

[73] Assignee: Blaupunkt-Werke GmbH, Hildesheim, Fed. Rep. of Germany

[21] Appl. No.: 932,732

[22] Filed: Nov. 19, 1986

[30] Foreign Application Priority Data

Mar. 1, 1986 [DE] Fed. Rep. of Germany ....... 3606737

[51] Int. Cl.⁴ .................. G08B 5/00; G08B 13/00; G08B 29/00
[52] U.S. Cl. .................... 340/691; 340/63; 340/568; 340/825.32
[58] Field of Search ............... 340/691, 571, 568, 540, 340/825.31, 825.32, 63, 825.34

[56] References Cited

U.S. PATENT DOCUMENTS

| | | |
|---|---|---|
| 4,035,765 | 7/1977 | Wenner et al. ............ 340/63 |
| 4,103,289 | 7/1978 | Kolber ..................... 340/571 |
| 4,246,573 | 1/1981 | Kiss ......................... 340/63 |
| 4,437,153 | 3/1984 | Kamiyama et al. ......... 340/63 |
| 4,494,114 | 1/1985 | Kaish ....................... 340/63 |
| 4,604,708 | 8/1986 | Lewis ..................... 340/825.31 |
| 4,638,293 | 1/1987 | Min ......................... 340/693 |

FOREIGN PATENT DOCUMENTS 3509562 9/1986 Fed. Rep. of Germany .

OTHER PUBLICATIONS

Sound Decisions, Forbes Magazine, Dec. 1, 1986.
Parts & Advice–Volkswagen, vol. 11, No. 2.

*Primary Examiner*—Glen R. Swann III
*Assistant Examiner*—Tat K. Wong
*Attorney, Agent, or Firm*—Frishauf, Holtz, Goodman & Woodward

[57] ABSTRACT

To provide recognition of personal data, for example the registration number of a vehicle in which a car radio is installed, the car radio includes a non-volatile memory (4) which can be selectively connected to a data input arrangement (2) for the electronic equipment (1) to store the registration number therein. A recall switch (S2) is provided to selectively connect the non-volatile memory (4) to the display (3) for displaying the personal recognition data or, in normal operation, to connect the display to the output of the electronic equipment, to display data pertinent to the operation of the electronic equipment, for example the frequency of a tuned station. Two additional memories (5, 6) store, respectively, a predetermined code word and, upon entry from the data entry arrangement, the same code word. Unless the two code words agree, the recall switch (2) is changed to display only the personal recognition data, for example the vehicle registration. Thus, the vehicle from which a radio has been stolen will be indicated unless the correct code is entered into the additional, and comparison memory. Few electronic components are needed which form part of the electronics of the car radio so that attempts to override the memory or destroy it will result in overall destruction of the electronic equipment.

15 Claims, 1 Drawing Sheet

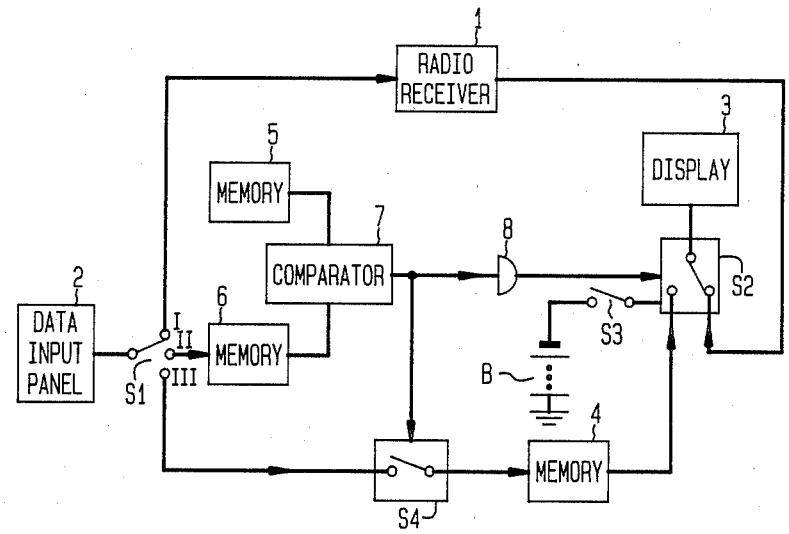

OWNER IDENTIFICATION SYSTEM FOR ELECTRONIC EQUIPMENT, PARTICULARLY AUTOMOTIVE AUDIO EQUIPMENT

The present invention relates to a system to identify the owner of electronic equipment, and particularly automotive electronic equipment which, frequently, is subject to theft.

BACKGROUND

Automotive audio equipment, such as car radios, car radio - cassette combinations and the like, are frequently stolen, particularly from vehicles which are parked and unattended. At times, the police is effective in retrieving stolen car radios; it is, however, very difficult, and frequently impossible to identify the owner of stolen audio equipment since the serial number of the equipment is often inaccessible, has been removed, damaged, or forged.

THE INVENTION

It is an object to provide a system, and more particularly a circuit which can readily provide a system, identification of the owner of removable electronic equipment, and especially automotive audio equipment.

Briefly, the audio equipment, typically a car radio or radio - cassette combination, is equipped with a non-volatile memory. Car radios, usually, have a display panel to display the frequency of a tuned station, and an input panel from which commands can be entered into the memory. Switching means are provided to couple the input panel to the non-volatile memory to enter into the non-volatile memory an alphanumeric personal recognition sequence, for example the owner's car registration number, or driver's license number. The system includes a recall switch to selectively connect (1) the non-volatile memory to the display to display the personal recognition sequence or (2) the display to an output ofthe electronic equipment, for example the car radio, to display data pertinent to the operation of the electronic equipment, for example a tuned station, whether a tape is being used or the like.

In accordance with a preferred feature of the invention, and to enhance the security of the system, the memory is made part of an integrated circuit which is included in the electronic equipment, so that destruction of the memory inherently also destroys the electrical circuitry of the equipment, and thus makes it useless.

The system has the advantage that electronically stored alphanumerical personal identification recognition data can be readily recalled by operating the recall switch, and directly displayed on a display. The display, then, permits a third party, for example the police, to determine the owner of the vehicle, or the driver's license identification, and thus to readily determine the owner of the stolen equipment. Additionally, by being able to quickly located the owner of the vehicle, the location of the theft could possibly be determined, which is important information for the police.

In accordance with a feature of the invention, the owner can enter his own personal recognition data, for example the vehicle registration number, by entering first a code into the memory, which code is known only to the owner. If, in accordance with a further feature of the invention, an incorrect code is entered into the memory, the display will automatically display the owner recognition data. If, at that time, for example while the equipment is still in the custody of unauthorized persons, it would be attempted to override this display of the vehicle from which the radio was removed, it would be necessary not only to destroy the memory which contains the information but, also, simultaneously destroy elements necessary for operation of the electronic equipment which, of course, will also destroy the entire value of the presumably stolen car radio.

DRAWING

The single FIGURE illustrates in form of a schematic block diagram the system in accordance with the present invention.

DETAILED DESCRIPTION

An automobile radio is schematically shown by block 1, which includes the usual elements such as tuner, amplifier circuitry and the like. Also included may be circuitry for operation of a tape cassette and associated switching circuitry. The receiver can be connected to a data input panel 2 for entry of data into a memory in the receiver by connecting the data input panel 2 via a three-position switch S1 to the receiver. Data regarding operation of the receiver, for example the frequency of a tuned station, is displayed on the display 3, which can be connected to the receiver by a transfer switch S2. The display 3 provides alpha-numeric displays.

In accordance with a feature of the invention, the display 3 can be selectively connected by the transfer switch S2 to a non-volatile first memory 4 in which personal recognition data, for example the registration number of a motor vehicle, are stored. The input of the first memory 4 can be selectively connected via an electronic switch S4 and the switch S1 to the data input panel 2.

In accordance with a further feature of the invention, a non-volatile second memory 5 is provided which retains a secret code word. The data input panel 2 can be connected via the switch S1 in a second switching position, indicated in the Figure by II, with a third memory 6. Upon operation of the data input and entering data therein, the memory 6 will retain the data which are stored therein by operation of selected switches or keys on the data input panel. The outputs of the two memories 5, 6 are connected to a comparator 7 which, if the code into the memory 6 agrees with the code stored in memory 5, provides an output signal which controls the switch S4 to connect the input of the first memory 4 with the terminal III of the switch S1. If the switch S1 is changed into its third switching position, to connect with the terminal III, first memory 4 can be loaded with the personal identification data, for example the registration number of the motor vehicle. The output of the comparator 7 is further connected over a control connection including an inverter 8 with the control input of the transfer switch S2. Transfer switch 2 can also be controlled from an anti-theft switch S3, for example part of an overall anti-theft unit, or upon removal of battery B.

OPERATION

In normal operation, the switch S1 is in the position shown in solid lines in the Figure, that is, connects the data input panel 2 via terminal I to the radio receiver, permitting display of the radio operating data on the display panel 3. The memory 5 retains a secret code word, for example entered therein by the manufacturer of the radio or of the vehicle, and notified to the owner of the radio upon purchase thereof. To enter the vehicle registration data into memory 4, it is then necessary to switch the switch S1 to the position II and enter the secret code word into the memory 6 via the data input panel 2. Upon concurrence, switch S4 will close whereupon, upon changing the switch S1 to the position III, the vehicle registration number can be entered into the memory 4.

If the radio is stolen and resold, and a new owner changes the switch S1 to the position II, and does not know the secret code word stored in memory 5, then, upon entry of an incorrect code word into memory 6, comparator 7 will provide a negative output signal which, on the one hand, leaves switch S4 as shown in the Figure and, further, causes via inverter 8 changeover of the transfer switch S2 which then will display the registration of the previous and legitimate owner of the radio; likewise, if the radio should be recovered by the police, entry of any information of the memory 6 will provide immediate information to the police regarding the registration of the vehicle from which the equipment was removed.

The transfer switch S2 can be operated manually as well, or from the control circuit of another anti-theft system; for example S2 can change over automatically if the radio is removed from power supply B to electrically lock the system to non-operative condition. Switch S2, thus, can have a normal position transferred to connect the display 3 to the memory 4 unless the code word in the memory 6 and the originally stored code in memory 5 agree, and electrical power is available to operate the comparator and hence provide a "not" output signal which positively changes over the switch S2 to the position shown in the drawing.

The invention is not limited to use with automobile radios; it can be equally used with other electric apparatus, for example other apparatus installed in motor vehicles, or in homes, and which have a display and a data input panel or arrangement, such as video cassette recorders, microwave ovens or the like. The data input panel need not have a specific alphanumeric keyboard but, equally, can operate with a "data enter" button which, upon repetitive operation, provides for the appropriate input of the alphanumeric data.

I claim:

1. Owner identification system for electronic equipment, particularly automotive audio equipment, wherein the electronic equipment (1) includes
   a memory means (4, 5, 6);
   an alphanumeric input means (2) for entering alphanumeric input data into the memory means of the equipment, and
   an output display device (3) for indicating alphanumeric data,
   comprising, in accordance with the invention,
   a non-volatile memory (4) forming part of the memory means;
   switch means (S1–S4) for coupling the alphanumeric input means to the non-volatile memory (4) for entering alphanumeric personal recognition data into the memory; and
   a recall switch means (S2) selectively
   (1) connecting the non-volatile memory (4) to the display means for displaying said personal recognition data, or
   (2) connecting the display means to an output of the electronic equipment for displaying data pertinent to the operation of said electronic equipment.

2. The system of claim 1, wherein said non-volatile memory (4) for storing alphanumeric personal recognition data forms an integral component of the electronic equipment.

3. The system of claim 1, wherein said non-volatile memory (4) storing the personal recognition data comprises an integral component of at least a portion of the electronic equipment, which portion controls the output display device (3).

4. The system of claim 1, wherein the memory means includes a non-volatile code retention memory element (5) and a code comparison memory element;
   a comparator (7) is provided connected to said memory elements (5, 6);
   and a controlled switch (S4) is provided, connected to and controlled by the output of the comparator, and selectively connecting said non-volatile memory (4) to the data input means (2) to permit entry by the data input means (2) into the non-volatile memory (4) of said personal recognition data if, and only if, a code entered into the code comparison memory element via the data input means (2) is identical to a code stored in the code retention element, so that the comparator (7) will provide a "correct" output signal and hence control the selectively operable controlled switch (4).

5. The system of claim 4, further including a control connection (8) from the comparator (7) to said recall switch means (S2) to control said recall switch means into the selective position (1) for display on the display means of said personal recognition data derived from the non-volatile memory (4) if a code entered into the code comparison memory element (6) from the input means (2) does not agree with the code stored in the non-volatile code retention element (5), and thereby inhibiting display of data pertinent to the operation of the electronic equipment (1).

6. The system of claim 4, wherein said non-volatile memory (4), said non-volatile code retention element (5) and said code comparison memory element (6) form an integral component of at least part of said electronic equipment (1).

7. The system of claim 5, wherein said non-volatile memory (4), said non-volatile code retention element (5), said code comparison memory element (6), said controlled switch (S4) and said logic connection means (8) form an integral component of at least part of said electronic equipment.

8. The system of claim 4, wherein the switch means includes a selector switch (S1) selectively connecting the alphanumeric input means (2) to:
   (a) said electronic equipment, for entering operating data therein;
   (b) the alphanumeric data input means (2) to said code comparison memory element (6); and
   (c) the alphanumeric data input means (2) to said non-volatile memory (4) for entering said personal recognition data into the non-volatile memory.

9. The system of claim 1, wherein the recall switch (S2) is a controlled switch which, upon severing of electrical supply connection to said electronic equipment (1) locks in the selected first position to provide, upon reconnection to a source of electrical energy, a connection for the non-volatile memory (4) to the display means (3) for displaying only the personal recognition data.

10. The system of claim 2, wherein the recall switch (S2) is a controlled switch which, upon severing of electrical supply connection to said electronic equipment (1), locks in the selected first position to provide, upon reconnection to a source of electrical energy, a connection for the non-volatile memory (4) to the display means (3) for displaying only the personal recognition data.

11. The system of claim 3, wherein the recall switch (S2) is a controlled switch which, upon severing of electrical supply connection to said electronic equipment (1), locks in the selected first position to provide, upon reconnection to a source of electrical energy, a connection for the non-volatile memory (4) to the display means (3) for displaying only the personal recognition data.

12. The system of claim 4, wherein the recall switch (S2) is a controlled switch which, upon severing of electrical supply connection to said electronic equipment (1), locks in the selected first position to provide, upon reconnection to a source of electrical energy, a connection for the non-volatile memory (4) to the display means (3) for displaying only the personal recognition data.

13. The system of claim 5, wherein the recall switch (S2) is a controlled switch which, upon severing of electrical supply connection to said electronic equipment (1), locks in the selected first position to provide, upon reconnection to a source of electrical energy, a connection for the non-volatile memory (4) to the display means (3) for displaying only the personal recognition data.

14. The system of claim 6, wherein the recall switch (S2) is a controlled switch which, upon severing of electrical supply connection to said electronic equipment (1), locks in the selected first position to provide, upon reconnection to a source of electrical energy, a connection for the non-volatile memory (4) to the display means (3) for displaying only the personal recognition data.

15. The system of claim 7, wherein the recall switch (S2) is a controlled switch which, upon severing of electrical supply connection to said electronic equipment (1), locks in the selected first position to provide, upon reconnection to a source of electrical energy, a connection for the non-volatile memory (4) to the display means (3) for displaying only the personal recognition data.

* * * * *